(12) United States Patent
Puchianu

(10) Patent No.: US 9,276,637 B2
(45) Date of Patent: Mar. 1, 2016

(54) COMMUNICATIONS ON POWER SYSTEMS

(75) Inventor: Silviu Puchianu, Portishead (GB)

(73) Assignee: GE Oil & Gas UK Limited, Bristol (GB)

( * ) Notice: Subject to any disclaimer, the term of this patent is extended or adjusted under 35 U.S.C. 154(b) by 1073 days.

(21) Appl. No.: 13/357,812

(22) Filed: Jan. 25, 2012

(65) Prior Publication Data
US 2012/0195385 A1 Aug. 2, 2012

(30) Foreign Application Priority Data

Jan. 31, 2011 (EP) .................................... 11152719

(51) Int. Cl.
*H02J 1/00* (2006.01)
*H04B 3/54* (2006.01)

(52) U.S. Cl.
CPC .......... *H04B 3/548* (2013.01); *H04B 2203/547* (2013.01); *H04B 2203/5458* (2013.01)

(58) Field of Classification Search
CPC ................ H04B 2203/5416; H04B 3/54–3/60; Y10S 307/01; Y02E 60/7815; H02J 13/002–13/0051; H05B 37/0263
See application file for complete search history.

(56) References Cited

U.S. PATENT DOCUMENTS

| | | | |
|---|---|---|---|
| 4,173,714 A | 11/1979 | Bloch et al. | |
| 4,398,178 A | 8/1983 | Russ et al. | |
| 2003/0052770 A1* | 3/2003 | Mansfield et al. | 340/310.01 |
| 2005/0264973 A1 | 12/2005 | Gardner et al. | |
| 2006/0055555 A1* | 3/2006 | Causier | 340/854.3 |
| 2006/0079971 A1* | 4/2006 | Billo | 700/90 |
| 2009/0195192 A1 | 8/2009 | Joseph | |

FOREIGN PATENT DOCUMENTS

| | | | | |
|---|---|---|---|---|
| AT | 513542 A1 * | 5/2014 | ............... | H04B 3/54 |
| EP | 0463341 A1 | 1/1992 | | |
| EP | 2104240 A1 | 9/2009 | | |
| GB | 2352376 A1 | 1/2001 | | |
| GB | 2441811 A | 3/2008 | | |
| WO | 0046923 A1 | 8/2000 | | |
| WO | 2004028064 | 4/2004 | | |

OTHER PUBLICATIONS

PCT Search Report and Written Opinion dated Apr. 5, 2012 from corresponding Application No. PCT/GB2012/050198.
EP Search Report dated Mar. 1, 2011 related to EP Application 11152719.8 filed on Jan. 31, 2011.

* cited by examiner

*Primary Examiner* — Daniel Cavallari
(74) *Attorney, Agent, or Firm* — GE Global Patent Operation

(57) ABSTRACT

A power and data supply system that includes circuitry for supplying power and data to an output via a common transmission line is provided. The circuitry comprises a DC power source, a data signal source, a modulator configured to generate a modulated signal in dependence on the data signal, and an inverter, wherein the inverter is controlled by the modulated signal, such that the inverter generates an AC signal for output to the transmission line.

15 Claims, 2 Drawing Sheets

COMMUNICATIONS ON POWER SYSTEMS

BACKGROUND OF THE INVENTION

1. Field of the Invention

Embodiments of the present invention relate to circuitry for supplying power and data, a power and data supply system, methods of supplying power and data, and a hydrocarbon extraction facility.

2. Description of the Prior Art

Conventionally, data communication between a surface location (known as "topside") and an underwater installation, such as a subsea fluid extraction well, is often achieved by coupling the communication data onto an AC power line, within the cable umbilical, feeding power for the control system to the well subsea tree. In such systems an analogue data waveform is superimposed on the AC power waveform at one end of the umbilical and at the other end, power and data filters are used to separate the power waveform from the data waveform. In this way, the number of lines within the umbilical may be reduced, since dedicated communications and power lines are no longer required in view of the combined communications and power line. The use of such communication on power (COPs) systems is popular when the distance from the surface well control platform and the underwater facility is long (i.e. tens of miles or more), as the saving of copper in the umbilical and thus the cost reduction is substantial. There is a problem however that present systems use hardware filters which need re-designing for every new subsea control system requirement. Furthermore these filters are not accurate, are space intensive due to having to handle large power and they introduce distortions, noise and power losses.

Prior art may be mentioned in U.S. Pat. No. 4,398,178, WO 00/46923, EP 2104240, GB 2441811, WO2004/028064, U.S. Pat. No. 4,173,714, EP0463341.

BRIEF SUMMARY OF THE INVENTION

In accordance with a first embodiment of the present invention, there is provided circuitry for supplying power and data to an output via a common transmission line, the circuitry comprises a DC power source, a data signal source, a modulator configured to generate a modulated signal in dependence on the data signal, and an inverter, wherein the inverter is controlled by the modulated signal, such that the inverter generates an AC signal for output to the transmission line.

In accordance with a second embodiment of the present invention, there is provided a power and data supply system, the system comprises the circuitry in accordance with the first embodiment, a transmission line for receiving the AC signal from the inverter, and for a converter configured to extract the data from the AC signal received from the transmission line.

In accordance with a third embodiment of the present invention, there is provided a hydrocarbon extraction facility, the facility comprises the power and data supply system according to the second embodiment, wherein the circuitry is located at a surface location, the transmission line is located within an umbilical cable connected between the surface location and an underwater location, and the converter is located at the underwater location.

In accordance with a fourth embodiment of the present invention, there is provided a method of supplying power and data to a common transmission line, the method comprises providing DC power to an inverter, modulating a data signal to generate a modulated signal in dependence on the data signal, and controlling the inverter using the modulated signal to generate an AC signal for output to the transmission line.

In accordance with a fifth embodiment of the present invention, there is provided a method of supplying power and data to a location. The method comprises supplying power and data to a transmission line input in accordance with the fourth embodiment, and extracting the data from the AC signal received from an output of the transmission line.

BRIEF DESCRIPTION OF THE DRAWINGS

Embodiments of the invention will now be described with reference to the accompanying drawings, in which.

DETAILED DESCRIPTION OF THE INVENTION

Embodiments of the present invention can overcome problems in the prior arts. Embodiments of the present invention implement a communications on power system by the use of a switching system, the system is controlled by a modulated signal to generate, directly, a transmitted waveform that is the sum of a power waveform and a data waveform. In another embodiment, an H-bridge electrical power switching system is used, the system is controlled by a pulse width modulated (PWM) signal, with received data extracted digitally. The system elements also facilitate power factor correction of the AC power supply.

H-bridge technology is well-known from existing variable frequency converter technology, but its application to COPs systems, using pulse width modulation, as an alternative to the use of bulky analogue filters, is considered novel.

Embodiments of the present invention provide various advantages. Embodiments of the present invention can provide a high potential for standardisation and modularisation, since, contrary to existing systems, no new hardware design work is required for embodiments of the present invention.

Embodiments of the present invention can provide a higher data accuracy, this is because the hardware power and/or data filters are replaced with a digital processing and the data waveform train can be inserted in the power waveform at the most appropriate noise-free locations (e.g. at zero voltage crossings), with optimal selection of carrier frequencies and amplitudes. The power source is DC but the transmitted waveform down the umbilical is AC, for example a 50 Hz sinewave produced by the high speed, pulse width modulation switching of the H-bridge. However, this H-bridge also acts to superimpose the data on the AC waveform, and thus can be controlled to cause superimposition of the data to occur at the zero crossing points of the AC waveform, for example.

Embodiments of the present invention can provide a higher power transmission efficiency through three major features. First, the use of a subsea CPU, which enables subsea active filtering and improved power factor correction (PFC). Second, a system in accordance with different embodiments of the present invention provide programmable topside power waveforms to counteract umbilical harmonic distortion effects induced by the cable. Third, a system in accordance with different embodiments of the present invention eliminates power losses, which were significant, in the hardware filters of existing COPs systems.

Embodiments of the present invention can provide a high functional flexibility, this is because power amplitudes, power frequencies, data amplitudes and data carrier frequencies are programmable.

Embodiments of the present invention can provide a higher power per volume coefficient, this is due to the replacement of transformers with modern power switching conversion technology, and the elimination of bulky hardware filters.

Figure 1:
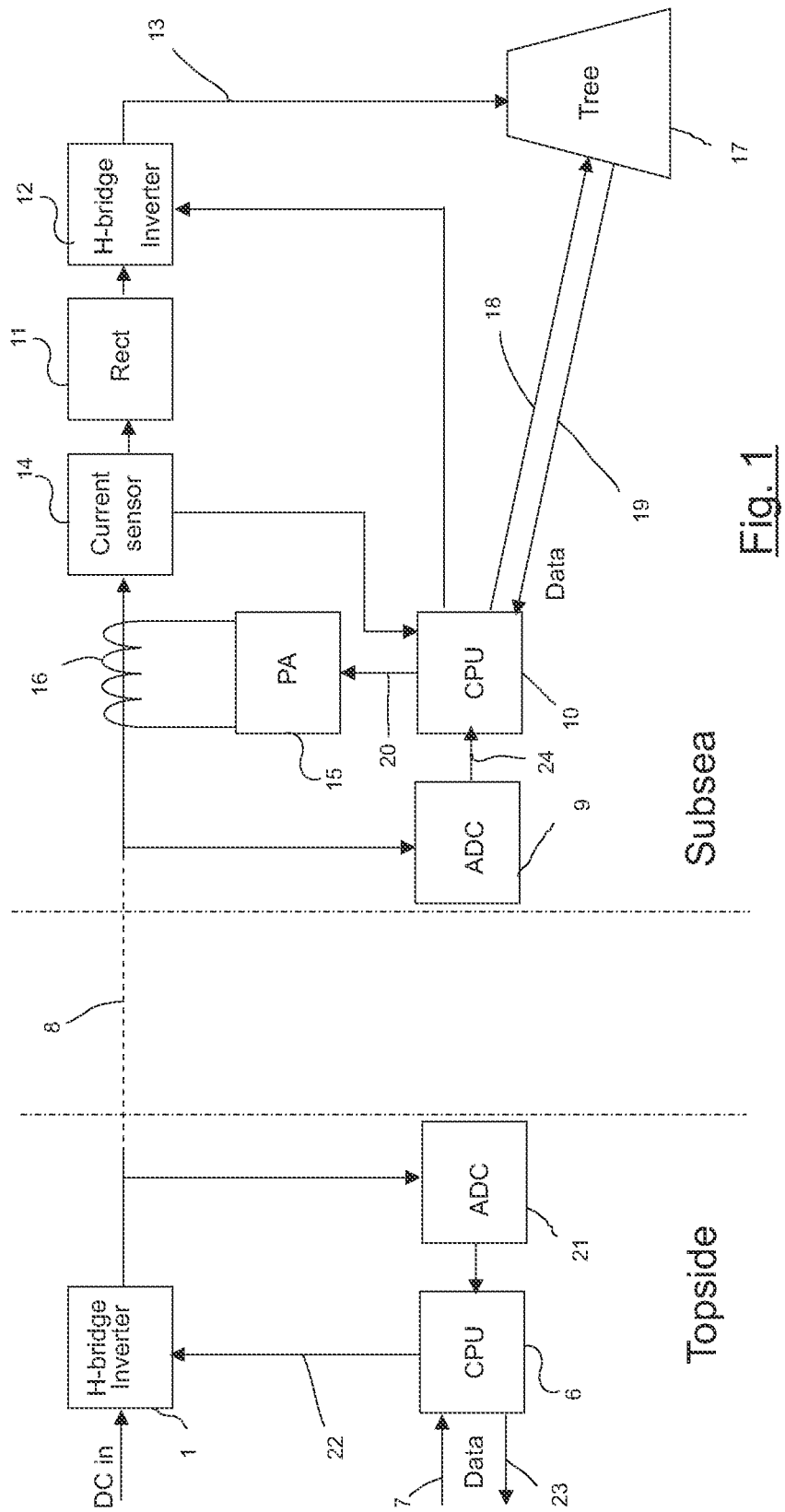
FIG. 1 schematically shows a system in accordance with one embodiment of the present invention.
Figure 2:
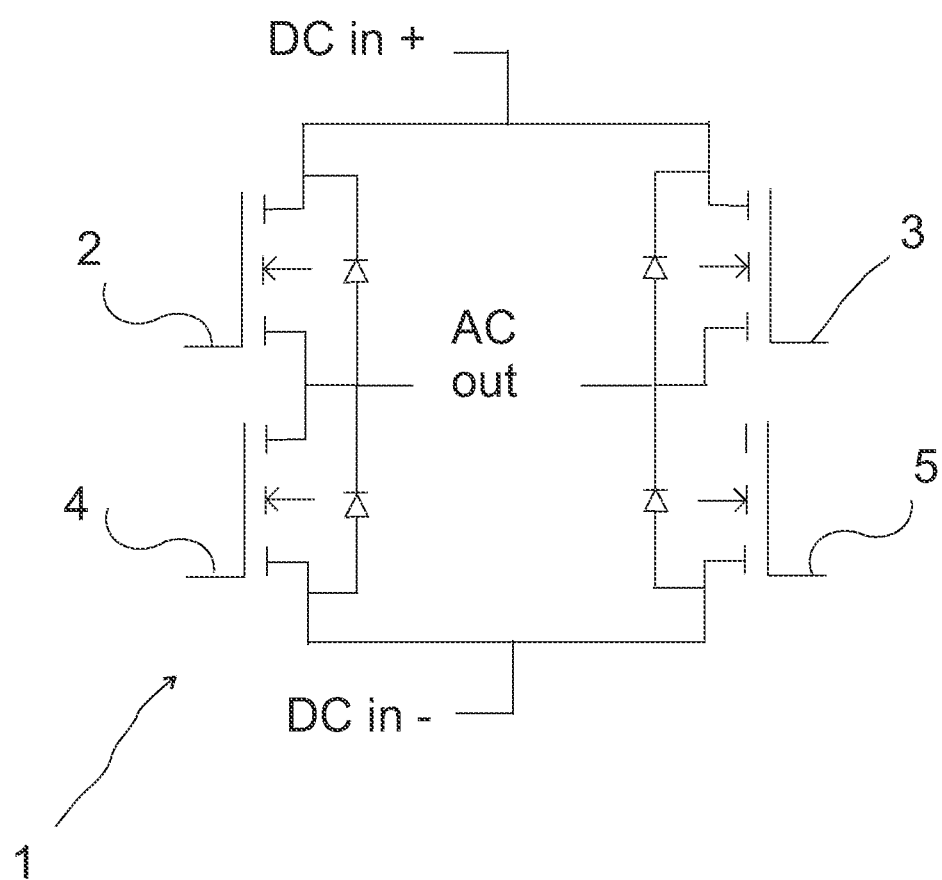
FIG. 2 schematically shows an H-bridge inverter configuration in accordance with one embodiment of the present invention.

According to the first embodiment of the present invention, a system for enabling bi-directional communication is schematically shown in FIGS. 1 and 2. A surface location, such as a vessel, platform, rig or shore-based station is shown schematically as "topside", while an underwater location, such as a seabed hydrocarbon extraction well or installation is shown schematically as "subsea". At the surface location, power and communications components to be sent to the subsea location are provided separately. DC power is supplied to an H-bridge inverter 1. As is known in the art, an H-bridge includes four power switching components arranged in a bridge configuration. The H-bridge inverter 1 is shown in more detail in FIG. 2 as comprising power field effect transistors (FETs) 2, 3, 4 and 5 as the power switching components, connected in a bridge configuration. The CPU 6 also receives an analogue data input 7, these input data being those required to be transmitted to the subsea location. The CPU 6 pulse width modulates the pulse train 22 according to the data input 7, to produce a signal with a succession of pulses with pulse widths dependent on the data input 7. The gates of the FETs 2, 3, 4 and 5 of inverter 1 are driven by the pulse train 22. In turn, the pulse train 22 effects a switching cycle of the H-bridge inverter 1 such that, for example, reception of a pulse at the inverter 1 triggers the start of the cycle at which point FETs 2 and 5 are switched on, and FETs 3 and 4 switched off, then the end of the pulse triggers the switching on FETs 3 and 4 while switching off FETs 2 and 5. Of course, the opposite switching scheme could equally be applied. In any case, the cycle is then repeated by each pulse of pulse train 22 being received at H-bridge inverter 1, such that the inverter 1 produces an AC output. This AC output is fed to a transmission line 8, typically housed within an umbilical cable which leads from the surface location to the subsea facility.

Since the switching of the FETs 2, 3, 4 and 5 is pulse width modulated according to the data input 7, the output AC from the H-bridge carries the information of data 7 superimposed on the power signal, such that the transmitted output AC waveform is the sum of a power waveform and a data waveform. The transmitted voltage waveform is AC sine wave, for example at around 50 Hz. The current waveform will also be approximately sinusoidal (but not a "pure" sine wave due to the current 'gulping' of components such as semiconductor rectifiers in the 'consumer' power supplies e.g. the power supply unit in the tree's subsea electronics module ("SEM"— not shown)) but will be out of phase to the voltage due to the inductance of the 'consumers' (e.g the transformer in the SEM).

The subsea end of the transmission line 8 is connected to equipment that, according to the facility set-up, may be located for example on a well tree, or at an umbilical termination assembly (UTA) in the case of a multiwell complex. In any case, the digital communications data is extracted from the power signal by an analogue to digital converter (ADC) 9. ADC 9 produces and outputs a signal 24, which includes components of the power signal waveform, i.e. current and voltage, and the digital data. This signal 24 is fed to a subsea-located CPU 10. The CPU 10 analyses this waveform in the frequency domain and extracts the data information 18, which is then sent to its required destination on the well tree 17. It can be seen therefore that CPU 10 effectively acts as a digital filter separating the data from the received AC waveform.

A current sensor 14 is located subsea in series between the subsea end of the transmission line 8 and a rectifier unit 11 to sense the current waveform of the signal received from the transmission line 8, and feed it to the CPU 10, as will be described below. The AC power at the subsea end of the umbilical 8 is rectified in a rectifier unit 11 to provide a DC output. This DC output is then fed to a subsea H-bridge inverter 12, which is of a similar form to that shown in FIG. 2. The H-bridge inverter 12 is controlled by the subsea CPU 10 to produce regularly timed switchings between pairs of FETs to produce an AC power supply 13, which is output to the well tree 17.

A further function of the CPU 10 is to decompose the power waveform i.e. current and voltage, into its harmonics. This harmonic content is used to apply power factor correction (PFC), by controlling the timing, i.e. phase, relative to the current in the transmission line 8, which is sensed by the current sensor 14, of the voltage waveform generated by the H-bridge subsea power converter. As noted above, the transmitted current waveform will generally be out of phase to the voltage waveform. Although this makes for somewhat inefficient power transfer, such power factor correction by the CPU 10 can minimise this problem.

The power supply 13 may be further modulated as required for satisfactory operation of well tree devices.

Since electric power is transmitted only in one direction i.e. from the surface DC power source to the subsea well tree 17, an alternative method to the pulse width modulation of an H-bridge inverter is required to transmit data from the well tree 17 back to the surface. This is achieved by another function of the subsea CPU 10, which converts digital data 19 received from the well tree 17 (particularly from a SEM of the tree 17) into an analogue signal and modulates a carrier signal accordingly. The carrier signal can for example be amplitude, or phase/frequency modulated in a conventional manner. The modulated carrier signal 20 is fed to a power amplifier 15, which provides sufficient drive to induce amplitude modulation to the power transmission line via a transformer 16. The transformer 16 is preferably not a bulky device, and may comprise a multi-turn primary winding on a bobbin, through which the power line passes. Once the modulated data signal is received at the surface location, it is converted back to a digital signal by a topside ADC 21, at the surface end of the transmission line. ADC 21 outputs to the CPU 6, to extract the data from the carrier signal and multiplex the "up" data (i.e. those data which are sent from the well tree 17 to the surface location) with the "down" data (i.e. those data which are sent from the surface location to the well tree 17).

The above-described embodiments are exemplary only, and other possibilities and alternatives within the scope of the invention will be apparent to those skilled in the art. For example, the H-bridge might, as is known in the art, be implemented by devices other than FETs, for example insulated gate bipolar transistors (IGBTs).

Furthermore, while the above embodiment makes use of pulse width modulation techniques, other forms of modulation of the H-bridge may be employed.

What is claimed is:

1. Circuitry for supplying power and data to an output via a common transmission line, the circuitry comprising:
    a DC power source;
    a data signal source;
    a modulator configured to generate a modulated signal in dependence on the data signal; and
    an inverter, wherein the inverter is controlled by the modulated signal, such that the inverter generates an AC signal for output to the transmission line, wherein the AC signal for output to the transmission line comprises a substantially sine wave AC signal with data superimposed on it.

2. The circuitry according to claim 1, wherein the modulator is operable to generate a pulse width modulated signal in dependence on the data signal.

3. The circuitry according to claim 1, wherein the inverter comprises an H-bridge.

4. A power and data supply system comprising:
circuitry according to claim 1;
a transmission line for receiving the AC signal from the inverter; and
a converter configured to extract the data from the AC signal received from the transmission line.

5. The power and data supply system according to claim 4, wherein the converter comprises an analogue to digital converter.

6. The power and data supply system according to claim 4, further comprising a rectifier.

7. The power and data supply system according to claim 6, comprising a further inverter.

8. The power and data supply system according to claim 7, wherein the further inverter comprises an H-bridge.

9. The power and data supply system according to claim 7, further comprising a controller configured to control the switching timing of the further inverter, the controller being operable to effect switching using timing dependent on the current of the received AC signal.

10. A hydrocarbon extraction facility comprising the power and data supply system according to claim 4, wherein the circuitry is located at a surface location, the transmission line is located within an umbilical cable connected between the surface location and an underwater location, and the converter is located at the underwater location.

11. A method of supplying power and data to a common transmission line, the method comprising:
providing DC power to an inverter operable to switch the DC power;
modulating a data signal to generate a modulated signal in dependence on the data signal; and
controlling the inverter using the modulated signal to generate a substantially sine wave AC sigma with data superimposed on it for output to the transmission line.

12. The method according to claim 11, wherein modulating the data signal comprises pulse width modulating the data signal.

13. The method according to claim 11, wherein the inverter comprises an H-bridge.

14. A method of supplying power and data to a location, the method comprising:
supplying power and data to a transmission line input in accordance with the method of claim 11; and
extracting the data from the AC signal received from an output of the transmission line.

15. The method according to claim 14, wherein extracting the data comprises analogue to digital conversion.

* * * * *